United States Patent

Pelletier

[15] 3,687,276
[45] Aug. 29, 1972

[54] SELF-PROPELLED CONVEYOR APPARATUS

[72] Inventor: Robert A. Pelletier, Winter Park, Fla.

[73] Assignee: Mechtron International Corporation, Orlando, Fla.

[22] Filed: Jan. 4, 1971

[21] Appl. No.: 103,810

Related U.S. Application Data

[63] Continuation of Ser. No. 752,365, Aug. 13, 1968, abandoned.

[52] U.S. Cl. .................................. 198/233, 198/88
[51] Int. Cl. ..................... B65g 41/00, B65g 37/00
[58] Field of Search ............... 198/88, 92, 109, 233

[56] References Cited

UNITED STATES PATENTS

| | | | |
|---|---|---|---|
| 3,598,224 | 8/1971 | Oury | 198/88 |
| 3,003,611 | 10/1961 | Pelzer | 198/88 |
| 3,067,858 | 12/1962 | Loosli | 198/233 |
| 3,171,534 | 10/1964 | Ourg | 198/92 |

FOREIGN PATENTS OR APPLICATIONS

| | | | |
|---|---|---|---|
| 610,340 | 5/1926 | France | 198/139 |
| 340,620 | 5/1920 | Germany | 198/139 |

*Primary Examiner*—Richard E. Aegerter
*Attorney*—William M. Hobby and Robert W. Duckworth

[57] ABSTRACT

A self-propelled conveyor apparatus in which a multiple system is mounted to a self-propelled crane having an extendable boom whereby extending, raising, lowering or rotation of the boom can be utilized to position the conveyor distribution and also to react the system for portage. A feeder conveyor is connected to a main conveyor and adapted to convey material from a loading hopper onto the main conveyor attached to the main boom. Extension conveyors are attached to extension booms and material from the main conveyor is discharged onto the first extension conveyor and from the first extension conveyor onto the second and finally discharged at the work area. The invention can convey concrete or the like over substantial distances and substantial heights such as multi-story buildings.

7 Claims, 3 Drawing Figures

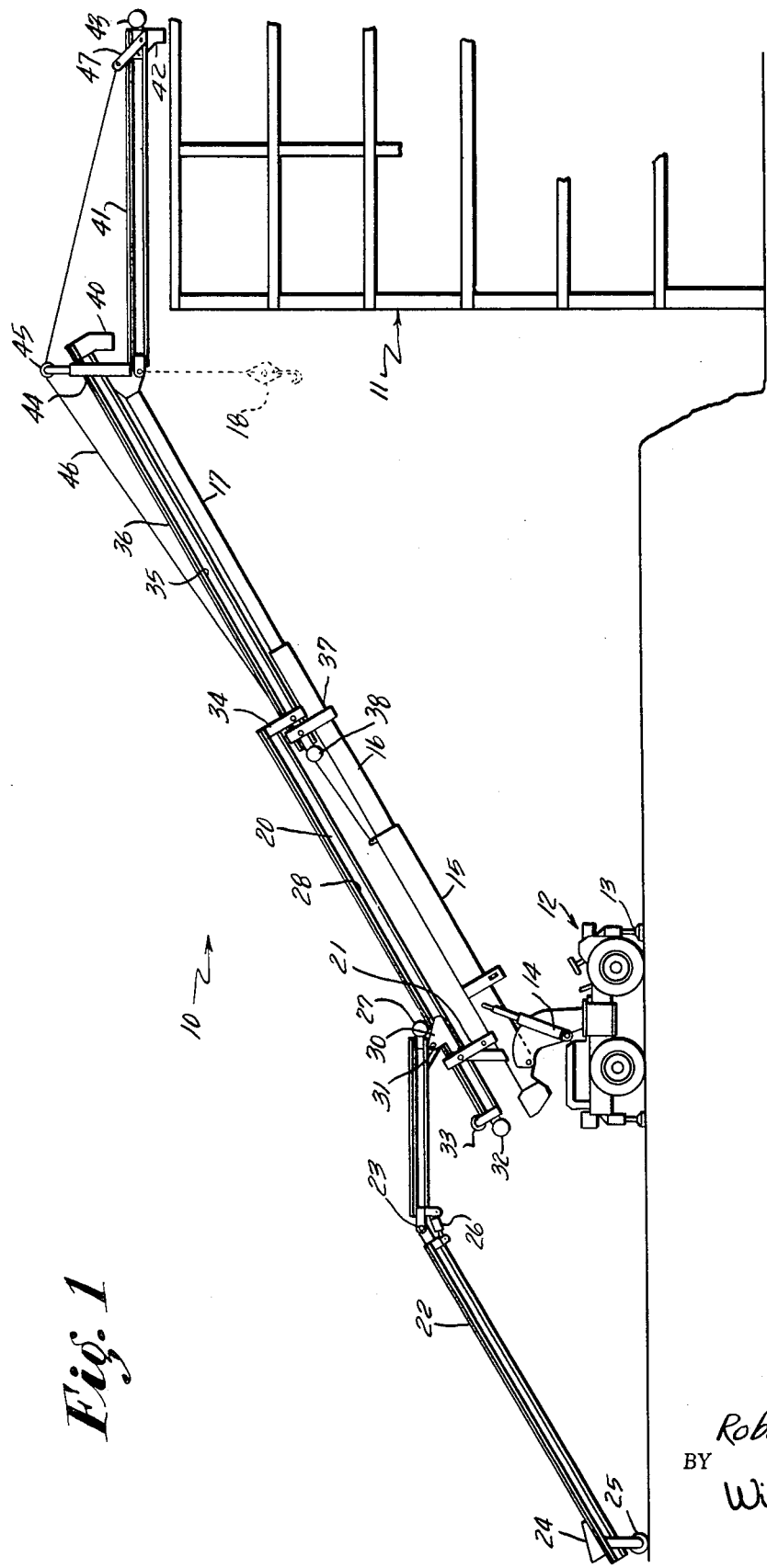

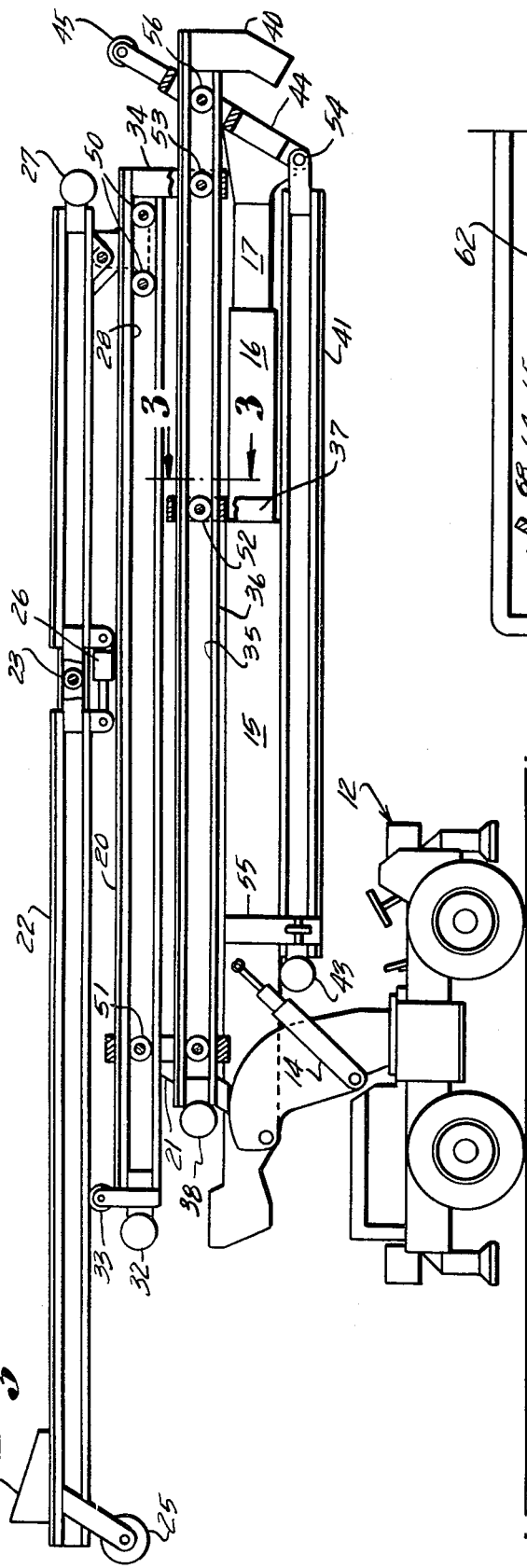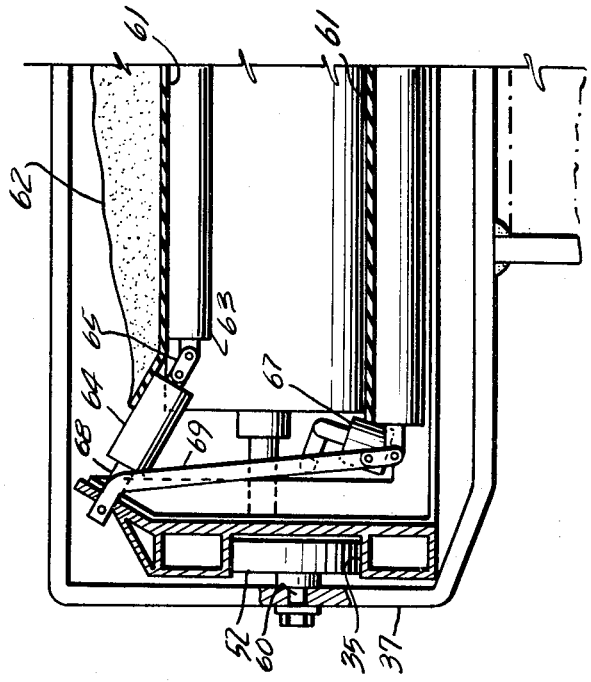

3,687,276

SELF-PROPELLED CONVEYOR APPARATUS

This is a continuation of application Ser. No. 752,365, filed Aug. 13, 1968, now abandoned.

BACKGROUND OF THE INVENTION

This is a continuation of application Ser. No. 752,365, filed Aug. 13, 1968, now abandoned.

1. Field of the Invention

The present invention relates to conveyors and more particularly to a combination of a multiple conveyor system with a self-propelled crane for conveying concrete or the like to substantial distances and heights and to a conveyor system especially adapted to convey materials too hard to reach places, such as areas below the surface of the earth for foundations, and the like, and above the surface of the earth onto each level of construction of multiple story buildings.

The present invention combines a self-propelled crane having an extendable boom with a conveyor system in which the conveyor system can be easily positioned by telescoping the boom and also by rotating or raising the boom. The conveyor system is further adapted to be placed compactly upon the crane for movement between localities.

2. Description of the Prior Art

In the past conveyor systems of all types have been used, including various types of bucket conveyors, apron conveyors, sliding conveyors and roller conveyors.

It has also been suggested to combine conveyors in different manners to deliver materials to various locations. One such system provides movable support stands with a frame upon each stand for connecting to a concrete conveyor. These stands and conveyors are located for one conveyor to feed the next for moving the concrete to the desired location. A second such system has been a conveyor attached to a trailer so that when the trailer is removed from a truck the feeder conveyor is positioned on a frame connected to the trailer. The distribution conveyor is pivoted on a point where the feeder conveyor discharges into it and may be rotated around a horizontal arc for placement.

Other trailer mounted conveyor systems have been suggested, such as a potato elevator for depositing potatoes in bins and a telescopic roller conveyor system with each conveyor having wheels movably attached to each other whereby the conveyors may be telescoped in and out on their wheels.

Finally, the present practice for moving concrete to a loading point such as from ready mix trucks onto the various levels of multistory concrete buildings is performed with cranes having buckets or skips attached thereto and each bucket is filled and moved by the crane to the desired location and discharged, or it may be necessary to discharge the buckets into buggies for movement over a runway to the desired location.

Unlike these prior art systems, the present invention provides a multiple conveyor system built onto a self-propelled crane which may be power operated to extend or retract the conveyor and may be rotated horizontally and raised in a vertical direction for locating the discharge of the distribution conveyor. The present invention may be used for the continuous movement of concrete to the distribution point, which may be continuously varied by the operator. Concrete may be moved from a subfloor up a multistory building at a fraction of the cost, time and labor or presently used systems of crane operated buckets and the like.

SUMMARY OF THE INVENTION

More specifically, a self propelled crane having a main boom and one or more extendable booms is provided which has a main conveyor attached to the main boom with one or more extendable booms being respectively attached to each extendable boom. A feeder boom is movably attached to the main conveyor to feed materials from a loading point onto the main conveyor and the main conveyor is movably attached to the first extension conveyor. Extending the boom of the crane will extend the conveyor system while raising the conveyor boom will raise the extended conveyors and rotating the boom on the crane may be used to better position the conveyor.

The present conveyor system advantageously allows the crane to be used for other purposes and is so built as to allow the conveyor system to be removed from the crane in a very short period of time of for better utilization of the crane.

An additional extendable conveyor may be added for distribution in the extended position and may be tucked under the retracted booms in the retracted position. The feeder boom is easily placed on top of the main conveyor by using self-contained rollers and also has a joint therein for flexibility whereby a bend may be made to accommodate the location of the loading area.

BRIEF DESCRIPTION OF THE DRAWINGS

Other objects, features and advantages of this invention will be apparent from a study of the written description and the drawings in which:

FIG. 1 is a diagramatic side elevation of one embodiment of the present invention;

FIG. 2 is a side elevation of the invention in a retracted position for transporting; and FIG. 3 is a view taken along line 3—3 of FIG. 2 illustrating a typical cross section of the conveyor structure and the conveyor supporting structures.

DESCRIPTION OF THE PREFERRED EMBODIMENTS

FIG. 1 of the present invention is illustrated at 10 in the operation of conveying materials from the ground level to the top of the multistory building 11. A self-propelled crane 12 has outriggers 13, hydraulic cylinder 14 operating the main boom 15 in a generally vertical direction. The frame of crane 12 will also swing the boom in a 360° circle of continuous rotation. Extension booms 16 and 17 may be telescoped in and out of boom 15 with extension boom 17 moving in and out of boom 16. One or more of these extension booms may be removed or added as the case may be depending upon the type of crane used. A cable hoist 18 is shown hanging from extension boom 17. At this point it should be noted that any self-propelled crane with extension booms can be used with present invention without departing from he scope and spirit of the invention. It is preferable at this time to use commercially available cranes such as Baldwin-Lima-Hamilton/Austin-Western Model 410 and 410-senior in the 10–12½ ton range which crane has been successfully utilized in the present invention.

Crane 12 has a main conveyor 20 mounted thereon with support brackets 21 being attached to the main Boom 15 and to the main conveyors 20. A feeder conveyor 22 has a joint 23 and a receiving hopper 24 and support wheel 25 for support on the earth. Joint 23 has a hydraulic cylinder 26, or the like, connected between the links of the feeder conveyor 22 for holding or locking the links at a fixed angle as desired while allowing the conveyor 22 to straighten out for loading on the crane for transporting purposes. Conveyor 22 is driven by an electric motor 27, or the like, which could for instance be hydraulic or pneumatically operated but I have found that a 10 horsepower electric motor operates satisfactorily. Conveyor 22 is movably connected to main conveyor 20 by wheels (not shown) sliding in a channel 28 on conveyor 20 with the wheels mounted on a support 30 movably connected to the conveyor by a pin connection 31 or the like.

The main conveyor has a separate Electric Motor 32 for driving its conveyor belt which may also be 10 horsepower but could be hydraulically or pneumatically operated. A wheel 33 is attached to conveyor 20 and allows conveyor 22 to roll thereon while loading conveyor 22 onto conveyor 20 for transporting from place to place.

At the other end of conveyor 20 a supporting bracket 34 is fixedly attached to conveyor 20 and has wheels rotatably attached thereto (not shown) for riding in a channel 35 of extension conveyor 36. Extension conveyor 36 has support brackets 37 attached thereto in a manner that the conveyor can slide or roll thereon or be locked in one place on the channels 35. The brackets 37 are fixedly attached to extension boom 16 of crane 12. Conveyor 36 has an electric motor 38 for driving a conveyor belt which motor may be 10 horsepower, or the like, and could also be hydraulic or pneumatically operated. Conveyor 36 has chute structure 40 for directing concrete and the like from its conveyor belt onto a distribution area or onto a second extension conveyor 41 when used. Conveyor 41 would have a similar chute 42 on one of its ends and a motor 43 similar to the motors for the other conveyors. A member 44 is attached to extension boom 17 and movably attached to one end of conveyor 36 and 41 and has a guide roller 45 rotatably attached thereto for guiding a cable 46. Cable 46 supports the other end of conveyor 41 by being attached to a bracket 47 attached to the conveyor 41. As can be seen the cable 46 can be used to raise or lower the distribution end of conveyor 41 to direct material coming from the conveyor to the appropriate place.

At this point it can be seen that a ready mix concrete mixing truck, or the like, could direct a load into hopper 24 where it would be conveyed over conveyor 22 onto conveyor 20 and thus onto conveyors 36 and 41, to a work area which could be several stories high on a multistory building. It should also be recognized that the conveyors can be varied by operating the telescoping booms so that boom 16 and 17 can extend or retract conveyors 36 and 41 by telescoping in and out and that the boom can be swung horizontally around in a circle or can be raised or lowered as desired. Feeding conveyor 22 on the other hand can be relocated by sliding it on conveyor 20 and by changing the angle of bend therein.

Referring now to FIG. 2, the embodiment of FIG. 1 can be seen in a retracted position ready for transporting to a new location. Crane 12 has the boom 15 lowered to generally horizontal position and conveyor 20 is also in a generally horizontal position. Feeder conveyor 22 is riding on rollers 33 and on wheels 50 riding in channels 28. Conveyor 22 has been straightened at joint 23 and is held straight by hydraulic cylinder 26. Motor 27, hopper 24 and wheel 25 can also be seen in this view as can motor 32 of conveyor 20. Conveyor 20 is supported by brackets 21 attached to boom 15 and to a roller or wheel 51 which may be held fixedly in channel 28 or may be moved for a more convenient ride. Extension conveyor 36 has been retracted to a position under conveyor 20 and extension boom 16 and 17 have been telescoped back into boom 15. Conveyor 36 is movably supported by wheel 52 which may be locked in one place or may be moved in channel 35. Wheel 52 is supported by brackets 37 which may be fixedly attached to the boom 16. Thus when boom 16 is fully retracted with bracket 37 against boom 15, a locking pin (not shown) may be removed from wheels 52 and the conveyor 36 pushed further back under conveyor 20. A support bracket 34 is fixedly attached to conveyor 20 and has movable wheels 53 sliding or rolling in channels 35 to support conveyor 20 on conveyor 36. Finally conveyor 41 is folded under the crane 12 retracted boom on a pivot point 54 on member 44 and attached to a holding bracket 55. Member 44 is movably pinned at pivot point 56 and has roller 45 connected to one end. Chute 40, motors 38 and 43 and hydraulic cylinder 14 can also be seen.

As can be seen the extended crane boom has been retracted and the conveyor 36 pushed a small additional distance over the crane, the conveyor 41 has then been folded under the boom and attached to the boom and the feeding conveyor has been slid upon the top of conveyor 20 and straightened out to form a convenient and compact assembly for transportation or storage. It should, of course, be realized at this point that the conveyor structure is designed for easy removal from the crane to allow greater versatility in the use of the crane.

Turning to FIG. 3 a cutaway view taken along line 3—3 of FIG. 2 is shown in which support bracket 37 can be more clearly seen along with wheel attached to bracket 37 by an axle 50 and riding in channel 35.

The conveyor belt 61 can be seen both on its load towing side and on its return side, a continuous or infinite belt conveyor being illustrated. The belt 61 carries a load of concrete 62 or the like and rides on support rollers 63 and 64 connected by a link 65. There would, of course, be two rollers 64 for each roller 63 even though only one roller 64 is shown here and return rollers 66 are used in the return of the belt. The rollers are attached to the conveyor frame members by links and the belts are driven by motors as already described. A roller guide 67 is used to keep the belt aligned in the frame and on the rollers and hanging rods 68 and 69 can be seen for holding their respective rollers.

While a specific embodiment of the invention has been described, it should be clear that other embodiments are contemplated as being within the scope of the invention. For instance, conveyor motors whose speeds may be varied may be used in order to adjust for different materials and the second extension conveyor may be removed when not needed and the second extension on the boom could be removed on certain embodiments and other types of cranes could also be used.

This invention is not to be construed as limited to the particular forms disclosed herein, since these are to be regarded as illustrative rather than restrictive.

I claim:

1. A self-propelled crane having an extendable boom and an extendable conveyor system, comprising in combination:
    a. a self-propelled crane having a main boom and at least one extendable boom extendable and retractable parallel to said main boom;
    b. a main conveyor connected in spaced relationship above said main boom, said main conveyor having a flexible endless belt driven by at least one motor;
    c. a feed conveyor movably attached to said main conveyor at one end thereof and adapted to convey materials from a loading point onto said main conveyor, said feed conveyor having an endless conveyor belt;
    d. an extension conveyor connected at one end to an extendable and retractable boom, and said extension conveyor having a flexible endless belt driven by at least one motor;
    e. said main conveyor being spaced above said main boom sufficiently to allow said extension conveyor to move between said main boom and said main conveyor during extension and retraction of said extension conveyor by said extendable and retractable boom extending and retracting; whereby materials are adapted to be placed over an area defined by the extension and retraction of said extension conveyor;
    f. Said feed conveyor being adapted to discharge materials onto said main conveyor and said main conveyor being adapted to discharge materials onto said extension conveyor and said extension conveyor being adapted to discharge said materials from said conveyor apparatus; and
    g. said crane boom being rotatable for rotating said main conveyor on said vehicle for extending the area of placement of materials by said apparatus.

2. The apparatus in accordance with claim 1 in which said feed conveyor is adapted to be placed on top of said main conveyor for transportation between locations, said feed conveyor being movably attached to said main conveyor by wheels riding in channels on said main conveyor so that said feed conveyor can be lifted at one end and rolled over said main conveyor.

3. The apparatus according to claim 2 in which each said extension conveyor is adapted to be retracted between said main boom and said main conveyor for transportation between locations, and said extension conveyor having a pair of channels riding on wheels, said wheels being rotatably connected to wheel supports attached to said extension boom.

4. The apparatus according to claim 3 in which said extendable boom has two telescoping elements telescoping into and out of said main boom and one said telescoping element telescoping into the other intermediate telescoping boom element and the main boom having one end of the main conveyor attached thereto with the other end riding on wheels in channels on said extension conveyor and said extension conveyor having its wheel support attached to said intermediate boom element and said extension conveyor being attached to said one telescoping element.

5. The apparatus according to claim 1 having two extension conveyors with the second extension conveyor being supported at one end by said extendable boom and at the other end by a power controlled cable adapted to raise and lower said other end.

6. The apparatus according to claim 5 in which said second extension conveyor is adapted to be folded under said main boom in a retracted position and said crane having means for attaching the other end of said second extension conveyor thereto for support during movement between locations.

7. The apparatus according to claim 1 in which said feed conveyor has a flexible joint located between the ends thereof and a locking means for locking said flexible joint at any desired angle of bend in said conveyor.

* * * * *